United States Patent Office

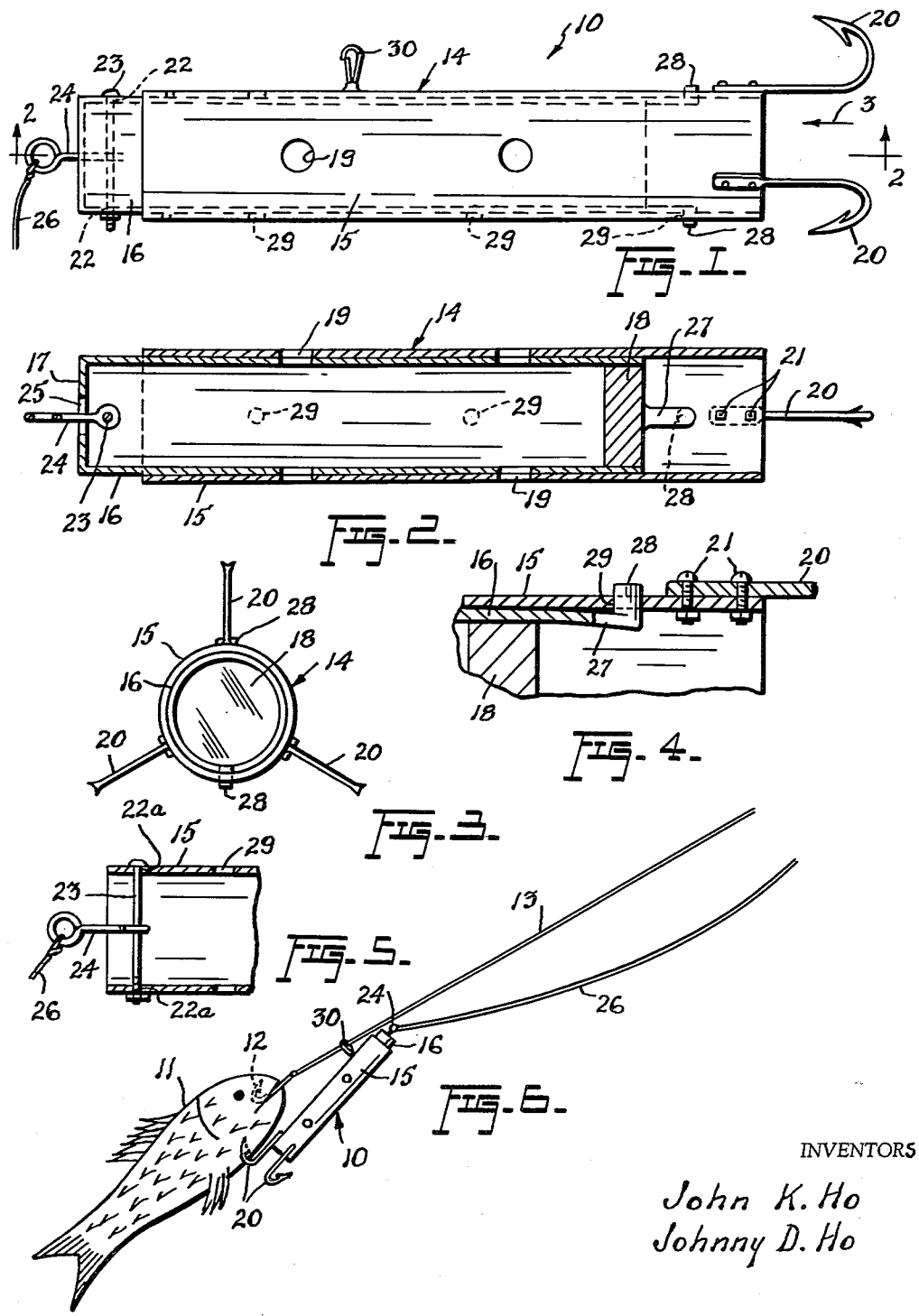

3,092,925
Patented June 11, 1963

3,092,925
FISHERMAN'S GAFFS
John K. Ho, 856 Market St., and Johnny D. Ho,
14 Isis St., Apt. 1, both of San Francisco, Calif.
Filed Oct. 11, 1960, Ser. No. 62,003
1 Claim. (Cl. 43—5)

This invention relates to new and useful improvements in fisherman's gaffs, and the principal object of the invention is to facilitate convenient and expeditions landing of fish caught on the hook of a fishing line.

In particular, the invention concerns itself with an improved gaffing device which may be separably attached to a fishing line and slid downwardly therealong toward the fish caught on the hook, and subsequently pulled out of the water when the fish is gaffed.

An important feature of the invention resides in the particular arrangement of the gaffing device whereby it is well adapted to function in the manner above outlined, while another important feature resides in an adjustable structure of the device itself, whereby it may be extended or contracted for effective use under various working conditions.

Some of the advantages of the invention reside in its simplicity of construction, efficient and dependable operation, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the invention;

FIGURE 2 is a longitudinal sectional view, taken substantially in the plane of the line 2—2 in FIGURE 1;

FIGURE 3 is an end view, taken in the direction of the arrow 3 in FIGURE 1;

FIGURE 4 is a fragmentary sectional detail of the locking means used in the invention;

FIGURE 5 is a fragmentary sectional detail showing an alternative arrangement wherein the pull line is connected to the outer rather than the inner section of the body; and FIGURE 6 is a side elevational view showing the invention in use.

Referring now to the accompanying drawings in detail, the fisherman's gaff in accordance with the invention is designated generally by the reference numeral 10 and is adapted for conveniently and expeditiously landing a fish 11 caught on a hook 12 of a conventional fishing line 13.

The gaffing device 10 embodies in its construction an elongated, substantially cylindrical, hollow body 14 which is composed of an outer section 15 and an inner section 16, the two sections being separably and slidably telescoped together so that the overall length of the body may be varied. The outer section 15 is open ended and the inner section 16 has a closed outer end 17 while its inner end is closed by a plug 18 of lead or similar material, which functions as a ballast or sinker to lower the entire device in water. Both sections are provided with registrable water passages 19 so that the device may fill with water upon immersion.

The end portion of the outer section 15 adjacent the plug 18 of the inner section is provided with a plurality of gaff hooks 20 which are replaceable and are secured in place by suitable bolts or screws 21. The inner section 16 is provided adjacent the end 17 with a pair of diametrically opposed apertures 22 to receive a removable bolt 23 carrying an eye-piece 24. The latter projects outwardly through an opening 25 in the end 17 and has connected thereto a pull line 26, the purpose of which will be hereinafter described.

Means are provided for locking the body sections 15, 16 against separation and relative sliding, these means comprising a set of resilient fingers 27 provided at the end of the inner section 16 adjacent the plug 18. The fingers are equipped at their free ends with outwardly directed protuberances or detents 28 which are selectively received in apertures 29 formed in the outer section 15, it being apparent that by engaging the detents in the various apertures, the overall length of the body 14 may be increased or decreased, as desired. Of course, by pressing the detents inwardly, they may be disengaged from the apertures 29 to facilitate relative sliding and/or separation of the sections 15, 16. The intermediate portion of the outer section 15 is provided with a clasp 30 which may be separably attached to the fishing line 13 for sliding movement of the entire device 10 along the line.

When it is desired to land the fish 11 caught on the hook 12 of the line 13, the device 10 is applied to the line 13 by means of the clasp 30 and the pull line 26 is payed out so that the device 10 slides downwardly along the line 13 toward the fish on the hook 12. When one or more of the gaff hooks 20 engage the fish, the device 10, the fish 11 and the line 13 are pulled out of the water by the line 26, so that easy and expeditious landing of the fish is facilitated.

The sections 15, 16 of the device may be extended for greater length of the body 14 when the device is used off boats or in deep water, and alternatively, the sections may be contracted when the device is used in shallow water or off shore, so that it is less likely to become caught on rocks or other submerged obstructions. Moreover, the device may be used without the inner section 16, this being achieved by removing the bolt 23 and withdrawing the eyepiece 24 from the inner section and installing the same in the outer section 15 as shown in FIGURE 5, it being noted that the outer section is provided with diametrically opposed apertures 22a, similar to the apertures 22, for receiving the bolt 23.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the invention as claimed.

What is claimed as new is:

A device for gaffing fish caught on a hook of a fishing line, said device comprising in combination, an elongated and longitudinally extensible and contractable hollow cylindrical body including a tubular front section having closed front and rear ends and an open-ended rear section slidably telescoped on said front section and projecting rearwardly beyond the closed rear end of the latter, a plurality of circumferentially spaced and radially outwardly oriented gaff hooks secured to the projecting rear end portion of said open-ended rear section, said hooks extending longitudinally rearwardly beyond the rear end of the rear section, means provided externally on the intermediate portion of said rear section for removably attaching the device to a fishing line for sliding movement therealong, a transverse pin provided in the front end portion of said front section, an eye member provided on said transverse pin and projecting forwardly through an opening in the closed front end of the front section for attachment to a pull line for actuating said device and controlling its movement along the stated fishing line, a set of circumferentially spaced resilient fingers provided at and projecting longitudinally rearwardly from the rear end of said front section adjacent the inside surface of the rear section, said rear section being provided with circumferentially spaced and longitudinally extending rows of apertures, and outwardly directed detents provided at the rear ends of said fingers, said detents being selectively received in the apertures of the respective rows whereby to adjustably lock said front and rear sections against relative sliding, said front and rear sections of said body being provided with lateral water passages spaced apart longitudinally of the respective sections by a distance corresponding to the spacing of said apertures in said rows, whereby the water passages in the respective sections may remain in register when the extensible and contractable body is locked against sliding by said detents in any preadjusted position.

References Cited in the file of this patent

UNITED STATES PATENTS

| | | |
|---|---|---|
| 1,982,132 | Boles | Nov. 27, 1934 |
| 2,210,271 | Thwaits | Aug. 6, 1940 |
| 2,233,670 | Lee | Mar. 4, 1941 |
| 2,235,371 | Jyrkas | Mar. 18, 1941 |
| 2,519,427 | Besmer | Aug. 22, 1950 |
| 2,641,078 | Gearien | June 9, 1953 |
| 2,807,906 | Mun | Oct. 1, 1957 |
| 2,986,839 | Crimble | June 6, 1961 |

FOREIGN PATENTS

| | | |
|---|---|---|
| 922,981 | France | Feb. 10, 1947 |